United States Patent Office 3,017,412
Patented Jan. 16, 1962

3,017,412
PROCESS FOR THE PRODUCTION OF 3.5-DIAMINOPYRAZINE - 2.6 - DICARBOXYLIC ACID DERIVATIVES
Anthony Fenwick Daglish, Cheadle Hulme, England, Rodolphe Vonderwahl, Riehen, near Basel, Switzerland, and George Arnold Tillotson, Hale, England, assignors to J. R. Geigy, A.-G., Basel, Switzerland
No Drawing. Original application May 23, 1958, Ser. No. 737,215. Divided and this application Aug. 4, 1959, Ser. No. 835,160
Claims priority, application Switzerland May 29, 1957
9 Claims. (Cl. 260—250)

The invention concerns a new process for the production in good yields of 3.2;5.6-bis - [2'.4'-dioxo-1'.2'.3'.4'-tetrahydro)-1'.4'-pyrimidinol]-pyrazines and the derivatives of 3.5-diaminopyrazine-2.6-dicarboxylic acids obtained therefrom by direct or step-wise saponification of free carboxyl groups while possibly further modifying such groups by amidation.

Up to now only a few processes are known for the production of 3.2;5.6-bis-[(2'.4'-dioxo-1'.2'.3'.4'-tetrahydro)-1'.4'-pyrimidino]-pyrazines which have been given the common name of bis-alloxazines. According to the literature these processes only give poor yields because of the side reactions which occur and because of the often troublesome purification of the crude products due to these side reactions. Thus for example, Brederick et al. (Berichte der deutschen chemischen Gesellschaft, vol. 86, page 845 (1953), disclose yields of at most 45% of the theoretical for the condensation of 2 molecules of 1.3-dimethyl-4.5-diamino-uracil in mineral acid soltuion while splitting off ammonium salt, or in vol. 87, page 1268 (1954), give the same yields for the condensation of one molecule of 1.3-dimethyl-4.5-diamino-uracil with one molecule of 1.3-dimethyl-alloxan. Also Timmis in U.S. Patent No. 2,581,889 mention yields of up to 63% of crude 3.2;5.6-bis - [1'.3'-dimethyl-2'.4'-dioxo - 1'.2'.3'.4'-tetrahydro) - 1'.4'-pyrimidino] - pyrazine (also called 1:3.1'.3'-tetramethyl-bis-alloxazine) for the condensation of one molecule of 1.3-dimethyl-4-amino-5-nitroso-uracil with one mol of 1.3-dimethyl barbituric acid.

It has now been found that very good yields of 3.5-diamino-pyrazine-2.6-dicarboxylic acid derivatives are obtained if one mol of 1.3-disubstituted 4-amino-uracil is condensed with 1 mol of 1.3-disubstituted 4-amino-5-nitroso-uracil while splitting off one mol of water and one mol of ammonia to form the corresponding 3.2;5.6-bis - [(2'.4'-dioxo-1'.2'.3'.4'-tetrahydro)-1'.4'-pyrimidino]-pyrazine and this compound is saponified by known methods either direct or in steps to form derivatives of 3.5-diaminopyrazine-2.6-dicarboxylic acid, if desired while modifying free carboxylic groups by amidation.

The good yields obtained in the process according to the present invention are chiefly due to the fact that the new condensation of 1.3-disubstituted 4-amino-uracils with 1.3-disubstituted 4-amino-5-nitroso-uracils to form 3.2;5.6 - bis - [(2'.4'-dioxo-1'.2'.3'.4'-tetrahydro) - 1'.4'-pyrimidino]-pyrazines, which is performed advantageously in polar organic solvents with an acid reaction and preferably in lower fatty acids, in particular in glacial acetic acid, proceeds more uniformly than the known processes.

Good yields of up to 90% of the theoretical of these valuable intermediate products are obtained and this in contrast to the syntheses mentioned even when the nitrogen atoms of the uracils are substituted by higher organic radicals than methyl groups. Also the 3.2;5.6-bis - [(2'.4'-dioxo-1'.2'.3'.4'-tetrahydro)-1'.4'-pyrimidino]-pyrazines variously substituted at the nitrogen atoms of the two tetrahydropyrimidine rings are obtained in good yields according to the new process. That the starting materials used according to the present invention would condense so favourably was surprising in view of the yields obtained in the known processes according to Bredereck and Timmis in which similar starting materials are used.

The 1.3-disubstituted 4-amino- or 4-amino-4-nitroso-uracils used according to the present invention can be symmetrically or unsymmetrically substituted at the nitrogen atom. As nitrogen substituents both hydrocarbon radicals and also substituted hydrocarbon radicals of the aliphatic, araliphatic, alicyclic, or aromatic series are used, for example, methyl, ethyl, n-propyl, isopropyl, n-butyl, hydroxyethyl, methoxyethyl, ethoxyethyl, γ-methoxypropyl, benzyl, chlorobenzyl, methylbenzyl, cyclohexyl, methyl-cyclohexyl, phenyl, methylphenyl, chlorophenyl, methoxyphenyl groups and starting materials having the same or different substituents at the nitrogen atom can be condensed.

Saponification of 3.2;5.6 - bis - [(2'.4'-dioxo-1'.2'.3'.4'-tetrahydro) - 1'.4'-pyrimidino] - pyrazines in aqueous, alcoholic or organic/aqueous solution or suspension, with alkalies such as sodium or potassium hydroxide, leads to the corresponding 3.5-bis-(sec. amino)-pyrazine-2.6-dicarboxylic acid amides. Under more vigorous conditions, for example in ethanolic potassium hydroxide, the 3.5-bis-(sec. amino)-pyrazine-2.6-dicarboxylic acid mono-amides are formed. In these compounds the free carboxyl group can be converted with thionyl chloride into the carboxylic acid halide group. Aminolysis of this group leads to the acid amides. A technically particularly simple method of performing the amidation consists in dissolving the carboxylic acid and the amine to be introduced in a strong tertiary nitrogen base such as pyridine, homologous pyridines or triethylamines and then stirring in gradually the necessary amount of thionyl chloride or phosphorus trichloride or bromide in the cold. After removal of the nitrogen base by dilution with water or steam, the 3.5-diaminopyrazine-2.6-dicarboxylic acid diamide is obtained direct. The free carbonyl group, which may be in the form of its salts, can also be esterified, for example on treating with dialkyl sulphates.

Other derivatives can be obtained in the aminolysis of the acid chloride group by using amines which contain different substituents from those originally at the nitrogen atom which was linked to the carbonyl group. In this way, in particular also aromatic and heterocyclic amine radicals can be introduced, for example phenylamino, methylphenylamide, chlorophenylamino, methoxyphenylamino, pyridyl-(2)-amino and morpholino groups. However, it is also possible to introduce hydroxy-alkylamino groups in this way, for example the monoethanolamide, diethanolamide, 2 - hydroxypropylamide group, also aminoalkyl carboxylic acid, carboxylic acid ester and carboxylic acid amide groups. Even urea and substituted urea groups, e.g. the monophenyl urea group can be introduced in this way.

However, also unsymmetrical amidated end products can be obtained by aminolysis of 3.2;5.6-bis-[(2'.4'-dioxo-1'.2'.3'.4' - tetrahydro) - pyrimidino-1'.4']-pyrazines at a higher temperature with amines such as e.g. benzylamine, whereby only one dioxo-tetrahydropyrimidino ring is split, and then further hydrolysing with alkalies.

There are, thus, several methods by which it is possible to vary at will the substitution of the diaminopyrazine dicarboxylic acid amides according to the desired intended use.

The following sequence illustrates the reactions described:

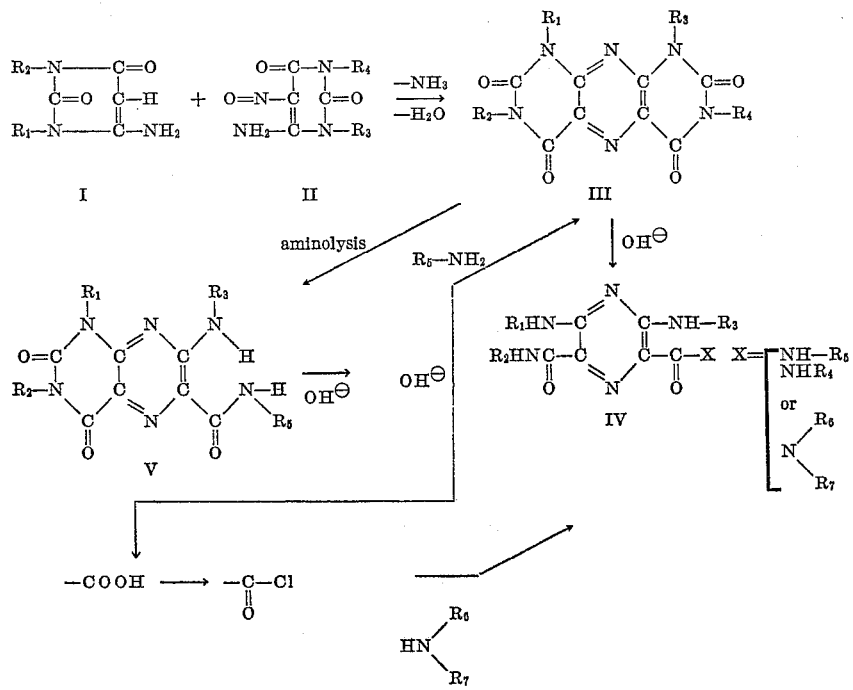

Both the intermediates of the Formulae III to V as well as the final compounds of the Formula IV are valuable intermediate products for the production of pharmaceutically active ingredients.

The derivatives of the 3.5-diaminopyrazine-2.6-dicarboxylic acid fluoresce in UV-containing light more or less strongly depending on their composition. The 3.5-bis-(sec. amino)-pyrazine-2.6-dicarboxylic acid amides of the general Formula IV, wherein X represents an amide radical, in particular the radical of a primary amine are particularly valuable because of their violet-blue, blue to green-blue fluorescence.

In the above sequence of reactions, $R_1$, $R_2$, $R_3$, $R_4$, $R_5$, $R_6$ and $R_7$ can represent the same or different organic radicals which have no dyestuff character; $R_6$ and $R_7$ can represent in addition, hydrogen.

$R_1$, $R_2$, $R_3$, $R_4$ represent preferably aliphatic radicals such as alkyl and substituted alkyl groups, for example methyl, ethyl, n-propyl, n-butyl, hydroxyethyl, β-hydroxypropyl, methoxyethyl, ethoxyethyl groups, however, they may also represent aralkyl and substituted aralkyl groups such as benzyl, methylbenzyl, chlorobenzyl, methoxybenzyl groups or cycloaliphatic radicals such as cyclohexyl, methyl-cyclohexyl groups. $R_6$ and $R_7$ can be hydrogen or the same as $R_1$, in addition $R_7$ can also be a heterocyclic radical, for example the 2-pyridyl radical or a divalent radical linking two pyrazine radicals, for example an alkylene or a diphenyl alkane radical; it can also represent a carbamyl radical, for example the phenyl carbamyl radical and thus X can also represent a urea radical or a ureido radical which may possibly be organically substituted. $R_6$ and $R_7$ together with the carbamide-N- atom can also represent a heterocyclic radical, for example a piperidino or a morpholino group.

Because of their fluorescence in ultraviolet light and in daylight, the 2.5-di-(sec. amino)-pyrazine-2.6-dicarboxylic acid derivatives of the Formula IV wherein X represents an amine radical, in particular the radical of a primary amine, are suitable for improving the appearance of more or less colourless carriers by optically compensating the yellowing thereof by the violet-blue, blue to green-blue fluorescence.

The following examples illustrate the invention. Where not otherwise stated, parts are given as parts by weight. The temperatures are in degrees centigrade. The relationship of parts by weight to parts by volume is as that of kilogrammes to litres.

*Example 1*

3.5-bis-ethylaminopyrazine-2.6-dicarboxylic acid-bis-ethylamide of the formula:

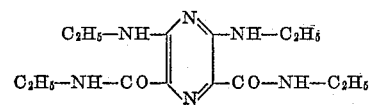

212 parts of 1.3-diethyl-4-amino-5-nitroso-uracil and 183 parts of 1.3-diethyl-4-amino-uracil are dissolved in 750 parts of glacial acetic acid and the solution is refluxed for 3 hours while stirring. The grey-greenish solution is cooled, the precipitate formed is filtered off under suction, washed well with water and dried. 320 parts of 3.2;5.6-bis-[(1′.3′-diethyl - 2′.4′ - dioxo - 1′.2′.3′.4′ - tetrahydro)-1′.4′-pyrimidino]-pyrazine are obtained as white crystals which melt at 233.5–234.5°. This corresponds to a yield of 89% of the theoretical calculated on the 1.3-diethyl-4-amino-5-nitroso-uracil used. An analytically pure preparation recrystallised from 75% acetic acid which melts at 235.5–236° has the following elementary analysis.

Calculated for $C_{16}H_{20}O_4N_6$: C=53.32%; H=5.59%; N=23.32%. Found: C=53.17%; H=5.61%; N=23.11%.

To saponify the 3.2;5.6-bis-[(1′.3′-diethyl-2′.4′-dioxo-1′.2′.3′.4′-tetrahydro)-1′.4′-pyrimidino]-pyrazine, 10 parts are refluxed for 2½ hours with 300 parts by volume of 1 N-caustic soda lye and 200 parts of ethanol. The precipitate which crystallises out on cooling is filtered off under suction, well washed and dried. 7.5 parts of 3.5-bis-ethylamino-pyrazine-2.6-dicarboxylic acid-bis-ethylamide (M.P. 133–134°) are obtained. An analytically pure preparation recrystallised from ethanol, has the same melting point and the following elementary analysis.

Calculated for $C_{14}H_{24}O_2N_6$: C=54.52%; H=7.84%; N=27.25%. Found: C=54.63%; H=8.00%; N=27.21%.

On using the corresponding amounts of 1.3-dipropyl-, 1.3-dibutyl- and 1.3-dimethyl-4-amino-uracil and of 1.3-dipropyl-, 1.3-dibutyl- and 1.3-dimethyl-4-amino-5-nitroso-uracil, the following 3.2;5.6-bis-[(1'.3'-dialkyl-2'.4'-dioxo-1'.2'.3'.4'-tetrahydro)-1'.4'-pyrimidino] - pyrazines are obtained in a similar manner:

| Alkyl | M.P., °C. | Elementary analysis, percent | | | | | |
|---|---|---|---|---|---|---|---|
| | | C cal'd | C found | H cal'd | H found | N cal'd | N found |
| n-C$_3$H$_7$ | 150–151 | 55.66 | 55.70 | 6.23 | 6.52 | | |
| n-C$_4$H$_9$ | 115–116 | 60.59 | 60.32 | 7.93 | 7.62 | 16.96 | 17.19 |
| CH$_3$ | 390 | 47.4 | 47.4 | 3.95 | 4.17 | 27.6 | 27.8 |

By saponifying these according to paragraph 2 of the example, the corresponding 3.5-bis-alkylaminopyrazine-2.6-dicarboxylic acid-bis-alkylamides are obtained:

| Alkyl | M.P., °C. | Elementary analysis, percent | | | | | |
|---|---|---|---|---|---|---|---|
| | | C cal'd | C found | H cal'd | H found | N cal'd | N found |
| n-C$_3$H$_7$ | 96–97 | 59.31 | 59.43 | 8.85 | 8.91 | | |
| n-C$_4$H$_9$ | 89–91 | (¹) | (¹) | (¹) | (¹) | (¹) | (¹) |
| CH$_3$ | 232–233 | 47.6 | 47.8 | 6.35 | 6.04 | 33.3 | 33.5 |

¹ The crystals contain crystal solvent.

All these 3.5-bis-alkylaminopyrazine-2.6-dicarboxylic acid-bis-alkylamides have a strong to very strong violet-blue fluorescence depending on their composition. Because of this property they can be used for improving the appearance of vinyl polymers.

*Example 2*

3-propylamino-5-ethylamino-pyrazine-2-carboxylic acid propylamide-6-carboxylic acid ethylamide of the formula:

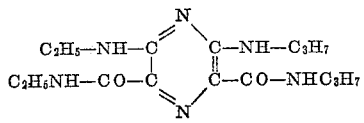

42 parts of 1.3-diethyl-4-amino-5-nitroso-uracil and 42 parts of 1.3-dipropyl-4-amino-uracil are dissolved in 150 parts of glacial acetic acid and the solution is refluxed for 3 hours while stirring. The pale brownish solution is cooled and diluted with water. The precipitate formed is filtered off under suction, washed well with water and dried. 70 parts of 3.2-[(1'.3'-diethyl-2'.4'-dioxo-1'.2'.3'.4' - tetrahydro) - 1'.4' - pyrimidino]-5.6-[(1'3'-dipropyl-2'.4'-dioxo-1'.2'.3'.4' - tetrahydro) - 1'.4' - pyrimidino]-pyrazine are obtained in the form of white crystals which melt at 147.5–149°. This corresponds to a yield of 90% of the theoretical, calculated on the 1.3-diethyl-4-amino-5-nitroso-uracil used. An analytically pure product recrystallised from ethanol melts at 150–151° and has the following elementary analysis.

Calculated for C$_{18}$H$_{24}$N$_6$O$_4$: C=55.66%; H=6.23%. Found: C=55.70%; H=6.52%.

To saponify the 3.2-[(1'.3'-diethyl-2'.4'-dioxo-1'.2'.3.4'-tetrahydro)-1'.4'-pyrimidino] - 5.6-[(1'.3' - dipropyl-2'.4'-dioxo-1'.2'.3'.4'-tetrahydro)-1'.4'-pyrimidino] - pyrazine, 10 parts are refluxed for 2½ hours with 300 parts by volume of 1 N-caustic soda lye and 200 parts of ethanol. The reaction mixture is cooled and then neutralized with diluted hydrochloric acid. The precipitate formed is filtered off under suction, washed and dried. 7.2 parts of 3-propylamino-5-ethylamino-pyrazine-2.6-dicarboxylic acid-2-propylamide-6-ethylamide are obtained, M.P. 91–92°.

An analytically pure preparation recrystallised from ethanol has the following elementary analysis.

Calculated for C$_{16}$H$_{28}$N$_6$O$_2$: C=57.12%; H=8.39%; N=24.98%. Found: C=57.14%; H=8.45%; N=24.91%.

On condensing 4-amino-uracils with 4-amino-5-nitroso-uracils which are differently alkyl substituted at the ring nitrogen atom, for example by using corresponding amounts of 1.3-dimethyl-, 1.3-diethyl- and 1.3-dipropyl-4-amino-uracils and 1.3-dimethyl-, 1.3-diethyl- and 1.3-dipropyl-4-amino-5-nitroso-uracils, the following unsymmetrical 3.2;5.6-[(1'.3'-dialkyl-2',4'-dioxo-1'.2'.3'.4'-tetrahydro-1'.4'-pyrimidino]-pyrazines are obtained in the same way:

| 1. Alkyl R$_1$ and R$_2$ | 2. Alkyl R$_3$ and R$_4$ | M.P., °C. | Elementary analysis | | | | | |
|---|---|---|---|---|---|---|---|---|
| | | | C cal'd | C found | H cal'd | H found | N cal'd | N found |
| —CH$_3$ | n-C$_3$H$_7$ | 169–163.5 | 53.32 | 53.36 | 5.59 | 5.57 | 23.32 | 23.24 |
| CH$_3$— | C$_2$H$_5$— | 253–254 | 50.60 | 50.61 | 4.85 | 4.72 | | |

On saponifying these according to paragraph 2 of the above example, the corresponding unsymmetrical 1.5-bis-alkylamino-pyrazine-2.6-dicarboxylic acid-bis-alkylamides are obtained:

| 1. Alkyl R$_1$ and R$_2$ | 2. Alkyl R$_3$ and R$_4$ | M.P., °C. | Elementary analysis | | | | | |
|---|---|---|---|---|---|---|---|---|
| | | | C cal'd | C found | H cal'd | H found | N cal'd | N found |
| CH$_3$— | n-C$_3$H$_7$ | 136–137 | 54.52 | 54.64 | 7.84 | 8.02 | 27.25 | 26.98 |
| CH$_3$— | C$_2$H$_5$— | 169–170 | 51.41 | 51.66 | 7.19 | 7.17 | 29.98 | 29.95 |

All these unsymmetrical 3.5-bis-alkylamino-pyrazine-2.6-dicarboxylic acid-bis-alkylamides have a strong to very strong violet-blue fluorescence depending on their composition. Due to this property, they can be used for the brightening of natural and synthetic polypeptides.

*Example 3*

3.5-bis-methylamino-pyrazine-2-carboxylic acid-phenylamide-6-carboxylic acid methylamide of the formula:

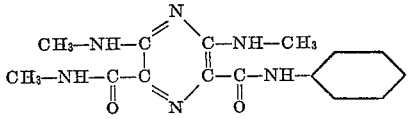

31 parts of 1.3-dimethyl-4-amino-uracil and 40 parts of 1.3-dimethyl-4-amino-5-nitroso-uracil are refluxed while stirring for 3 hours in 200 parts of glacial acetic acid. The reaction mixture is cooled, the precipitate formed is filtered off under suction, washed well with water and dried. 51 parts of 3.2;5.6-bis-[(1'.3'-dimethyl-2'.4'-dioxo-1'.2'.3'.4'-tetrahydro) - 1'.4' - pyrimidino]-pyrazine are obtained in the form of white crystals which melt at 390° (the melting point depends on the heating time). This corresponds to a yield of 84% of the theoretical, calculated on the 1.3-dimethyl-4-amino-uracil used. Recrystallised from 75% acetic acid, an analytically pure preparation has the following elementary analysis.

Calculated for C$_{12}$H$_{12}$O$_4$N$_6$: C=47.4%; H=4.17%; N=27.8%. Found: C=47.4%; H=3.95%; N=27.6%.

To saponify the 3.2;5.6-bis-[(1'3'-dimethyl-2'.4'-dioxo-1'.2'.3'.4'-tetrahydro) - 1'.4' - pyrimidino]-pyrazine, 152 parts are refluxed for 6 hours with a solution consisting of 200 parts of potassium hydroxide and 2400 parts of ethanol. 117 parts of 3.5-bis-methylamino-2-carboxypyrazine-6-carboxylic acid methylamide (M.P. 214° decomposition dependent on the heating time) are obtained. Recrystallised from ethanol, an analytically pure preparation has the following elementary analysis.

Calculated for C$_9$H$_{13}$O$_3$N$_5$+½H$_2$O: C=43.48%; H=5.68%; N=28.3%. Found: C=43.59%; H=5.50%; N=28.45%.

To amidate the 3.5-bis-methylamino-2-carboxypyrazine- 6-carboxylic acid methylamide 20 parts are mixed with 150 parts of thionyl chloride. The mixture is left to stand for 45 minutes and then the excess thionyl chloride is removed in the vacuum. The remaining crystalline acid chloride is then slowly added to a solution of 10 parts of aniline and 400 parts of abs. pyridine, which solution is cooled with a mixture of ice/sodium chloride and stirred overnight. The pyridine is then removed by steam distillation, the residue is filtered off under suction and washed well with water. Pale yellow crystals of 3.5-bis-methylamino-pyrazine-2-carboxylic acid phenylamide-6-carboxylic acid methylamide are obtained which melt at 195–197°.

Recrystallised from ethanol, an analytically pure preparation melts at 198–198.5° and has the following elementary analysis.

Calculated for $C_{15}H_{18}O_2N_6$: C=57.31%; N=5.77%; N=26.74%. Found: C=57.42%; N=6.01%;

$$N = 26.86\%$$

Amidation of 3.5-bis-methylamino-2-carboxy-pyrazine-6-carboxylic acid methylamine in pyridine or in an aqueous medium according to paragraph 3 of this example with the amines corresponding to R in the following table, produces the following compounds:

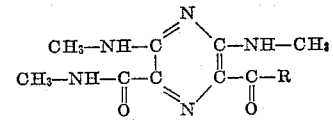

| No. | R | M.P.,[1] °C. | Colour of fluorescence |
|---|---|---|---|
| 1 | —NH$_2$ | 290–292 | Violet-blue. |
| 2 | —NH—CH$_2$—CH$_2$OH | 210–210.5 | Do. |
| 3 | —NH—CH$_2$—CH$_3$ | 218–219 | Do. |
| 4 | —NH—CH$_2$—CH$_3$ | 197–198.5 | Do. |
| 5 | —NH—CH$_2$—⟨phenyl⟩ | 218.5–220 | Blue-violet. |
| 6 | —NH—CH$_2$—CH$_2$—⟨phenyl⟩ | 76–78 | Do. |
| 7 | —NH—⟨phenyl-OCH$_3$⟩ | 126.5–127 | Blue. |
| 8 | —NH—CH$_2$—CH$_2$—CH$_2$—CH$_3$ | 194–196 | Violet-blue. |
| 9 | —NH—⟨phenyl⟩—O—⟨phenyl⟩ | 252–254 | Blue. |
| 10 | —NH—CH$_2$—CH=CH$_2$ | 194–195.5 | Violet-blue. |
| 11 | —NH—(CH$_2$)$_7$—CH$_3$ | 121–121.5 | Do. |
| 12 | —NH—CH⟨cyclopentyl⟩ | 237–238 | Blue-violet. |
| 13 | —N(CH$_3$)$_2$ | 128–129 | Violet. |
| 14 | —NH—CH(CH$_2$—CH$_3$)(CH$_3$) | 188–190 | Violet-blue. |
| 15 | —NH—⟨pyrimidinyl⟩ | 223–224 | Blue-violet. |
| 16 | —N(CH$_3$)—C(CH$_3$)$_3$ | 204–205 | Violet-blue. |
| 17 | —NH—⟨phenyl⟩—CH$_3$ | 211–212.5 | Blue-violet. |
| 18 | —NH—⟨phenyl(CH$_3$)⟩ | 194–195 | Do. |
| 19 | —NH—⟨phenyl(CH$_3$)⟩ | 172–173 | Do. |
| 20 | —NH—⟨phenyl⟩—Cl | 261–262.5 | Do. |

See footnote at end of table.

| No. | R | M.P.,¹ °C. | Colour of fluorescence |
|---|---|---|---|
| 21 | —NH—C₆H₄—Cl | 186–187 | Blue violet. |
| 22 | —NH—C₆H₃(Cl)(Cl) | 216–217 | Violet-blue. |
| 23 | —NH—C₆H₄—COOH | 268–270 | Do. |
| 24 | —NH—C₆H₄—SO₃H | ---------- | Do. |
| 25 | —NH—C₆H₄—SO₃H | ---------- | Do. |
| 26 | —NH—C₆H₄—NH—SO₂—C₆H₄—CH₃ | 226–227 | Do. |
| 27 | —NH—C₆H₄—SO₂NH₂ | 234–236 | Do. |
| 28 | —NH—CH(CH₂—CH₂)₂(CH₂—CH₂) (cyclohexyl) | 155–156 | Do. |
| 29 | —NH—CH(CH₃)₂ | 175–177 | Do. |
| 30 | —NH—CH₂—CH₂—CH₂OH | 147–149 | Do. |
| 31 | —NH—C(pyridyl) | 209–211 | Blue-violet. |
| 32 | —NH—C(3,5-dimethyl-1-phenylpyrazolyl) | 267–269 | Do. |
| 33 | —HN—C(thiazolyl) | 234–236 | Do. |
| 34 | —HN—C(methylthiadiazolyl) | 262–263 | Do. |
| 35 | —HN—C(1-phenylpyrazolyl) | 236–238 | Do. |
| 36 | —HN—(quinolyl) | 232–234 | Do. |

¹ The melting points depend greatly on the heating time.

If, in the process according to paragraph 3 of the above example, the urea corresponding to R in the following table is reacted in pyridine with the 3.5-bis-methylamino-2-carboxy-pyrazine-6-carboxylic acid methylamide, then the following compounds are obtained:

| No. | R | M.P.,[1] °C. | Colour of fluorescence |
|---|---|---|---|
| 37 | —NH—C(=O)—NH—C₆H₅ | 233–234 | Blue. |
| 38 | —NH—C(=O)—NH—CH₂—C₆H₅ | 190–191 | Violet-blue. |
| 39 | —NH—C(=O)—NH—CH₃ | 215–217 | Do. |

[1] The melting points depend greatly on the heating time.

On using corresponding amines of 1.3-dibenzyl- and 1.3-diethyl-4-amino-uracils and 1.3-dibenzyl- and 1.3-diethyl-4-amino-5-nitroso-uracils, the 3.2;5.6-bis-[1'.3'-dibenzyl-2'.4' - dioxo - 1'.2'.3'.4' - tetrahydro)-1'.4'-pyrimidino]-pyrazines and 3.3;5.6-bis[(1'.3'-diethyl-2'.4'-dioxo-1'.2'.3'.4'-tetrahydro)-1'.4'-pyrimidino]-pyrazines are obtained in the same manner. On saponifying these according to paragraph 2 of this example, the corresponding 3.5-bis- substituted aminopyrazine-2-carboxylic acid-6-carboxylic acid benzyl- or ethyl-amides are obtained.

| Substituent R₁, R₂ and R₃ | M.P., °C. | C cal'd | C found | H cal'd | H found | N cal'd | N found |
|---|---|---|---|---|---|---|---|
| —CH₂—C₆H₅ | 161–162 | 69.36 | 69.30 | 5.39 | 5.36 | 14.98 | 15.06 |
| —C₂H₅ | 174–175 | 51.23 | 51.32 | 6.81 | 7.02 | 24.90 | 25.08 |

By amidation in pyridine according to paragraph 3 of this example, the corresponding 3.5-bis-ethyl- or -benzyl-aminopyrazine-2-carboxylic acid ethyl- or benzyl-amide-6-carboxylic acid amides are obtained, for example:

To saponify the 3.2[(1'.3'-dimethyl-2'.4'-dioxo-1'.2'-3'.4' - tetrahydro) - 1'.4' - pyrimidino] - 5.6 - [(1'.3' - diethyl - 2'.4' - dioxo - 1'.2'.3'.4' - tetrahydro) - 1'.4' - pyrimidino]-pyrazine, produced for example as in Example 2, 57 parts of this compound are refluxed for 6 hours with a solution consisting of 45 parts of potassium hydroxide and 500 parts of ethanol. The ethanol is distilled off, the reaction mixture is acidified with diluted hydrochloric acid and 43 parts of 3-methylamino-5-ethylamino-pyrazine-2-carboxylic acid-6-carboxylic acid ethyl amide are isolated. The compound melts at 160–162° (the melting point depends on the heating time).

Recrystallised from methanol, an analytically pure preparation has the following elementary analysis.

Calculated for $C_{11}H_{17}O_3N_5$: C=49.43%; H=6.41%; N=26.20%. Found: C=49.99%; H=6.49%; N=26.27%.

To amidate the 3-methylamino-3-ethylamino-pyrazine-2-carboxylic acid-6-carboxylic acid ethylamide, 20 parts of this compound are mixed with 100 parts of thionyl chloride. The mixture is left to stand for 45 minutes and then excess thionyl chloride is removed in the vacuum. The acid chloride which remains is then poured into a solution of 300 parts of concentrated aqueous ammonia and 100 parts of ethanol, which solution has been cooled with a mixture of ice and sodium chloride. The whole is stirred overnight. The precipitate formed is filtered off under suction and washed well with water. 3-methyl-amino-5-ethylamino-pyrazine-2-carboxylic acid amide-6-carboxylic acid ethylamide is obtained in the form of pale yellow crystals which melt at 212–214°.

Recrystallized from ethanol, an analytically pure preparation melting at 223–224° has the following elementary analysis.

Calculated for $C_{11}H_{18}O_2N_6$: C=49.61%; H=6.81%; N=31.56%. Found: C=49.49%; H=6.90%; N=31.88%.

The following 3-methylamino-5-ethylamino-pyrazine-2-carboxylic acid alkylamide-6-carboxylic acid ethylamides

| No. | Substituent R₁, R₂ and R₃ | X | M.P., °C. | C Cal'd | C found | H cal'd | H found | N cal'd | N found |
|---|---|---|---|---|---|---|---|---|---|
| 40 | C₂H₅ | —NH—C₆H₅ | 146.5–147.5 | 60.65 | 60.77 | 6.79 | 7.07 | 23.58 | 23.55 |
| 41 | C₂H₅ | —NH—C(pyrimidyl) | 108–109 | 56.9 | 56.6 | 6.7 | 6.7 | 26.6 | 26.6 |

Because of their fluorescence and their drawing power, the compounds listed in the examples and the tables can be used with success for the brightening of textile fibres.

Example 4

3-methylamino-5-ethylamino-pyrazine-2-carboxylic acid amide-6-carboxylic acid ethylamide of the formula:

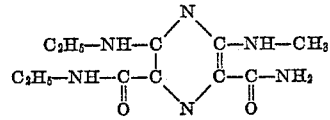

for examples are obtained in the same manner on amidation with other amines:

| Alkyl | M.P., °C. | C cal'd | C found | H cal'd | H found | N cal'd | N found |
|---|---|---|---|---|---|---|---|
| —C₂H₅ | 162–164 | 53.04 | 53.06 | 7.53 | 7.59 | 28.55 | 28.53 |
| —C₃H₇ | 84–86 | 53.3 | 53.4 | 7.85 | 7.93 | 26.7 | 26.8 |
| —CH₂—C₆H₅ | 87–89 | 59.6 | 59.3 | 6.86 | 6.68 | 23.2 | 23.4 |

Depending on their composition, all these 3-methyl-amino-5-ethylamino-2-carboxylic acid alkylamide-6-carboxylic acid ethylamides have a strong to very strong violet-blue fluorescence. Because of this property they can be used for the brightening of natural as well as synthetic polypeptide fibres.

Wool treated in an acid bath or in a neutral bath has a considerably more white appearance than untreated wool.

Nylon treated in an acid bath has a much more white and luminous appearance than before treatment.

Also fibres made up from cellulose acylates can be beautifully brightened with these unsymmetrical pyrazine derivatives.

Such 3-methylamino-5-ethylamino-2-carboxylic acid alkylamide-6-carboxylic acid methyl amides are also suitable however for the brightening of vinyl polymers because of their intensive fluorescence. Thus, for example, polyvinyl chloride foils produced according to paragraph (a) of Example 1, have a much more white appearance in daylight than such foils which contains no brightening agent.

This is a divisional application of applicants' prior application Serial Number 737,215, filed May 23, 1958.

What we claim is:

1. A process for the production of 3.5-diamino-pyrazine-2.6-dicarboxylic acid amides which comprises condensing one molecular proportion of 1.3-dialkyl-4-amino uracil with substantially one molecular proportion of 1.3-dialkyl-4-amino-5-nitroso uracil in an acidic medium while splitting off water and ammonia to form 3.2;5.6-bis[(1'.3'-dialkyl - 2'.4' - dioxo - 1'.2'.3'.4' - tetrahydro) - 1'.4' - pyrimidino]-pyrazine and saponifying this compound with an alkali metal hydroxide to form the 3.5-diamino-pyrazine-2.6-dicarboxylic acid amide while splitting off two molecular proportions of carbonic acid and transforming any carboxylic acid group formed during said alkaline treatment into a carboxylic acid amide group by treating said saponification product with a member selected from the group consisting of thionyl chloride, phosphorus trichloride and phosphorus tribromide to form the corresponding carboxylic acid halide and treating said carboxylic acid halide with a member selected from the group consisting of ammonia, primary alkyl amine, lower primary alkenylamine, lower primary hydroxyalkylamine, primary phenyl-lower alkylamine, prmiary cyclohexylamine, primary phenylamine, primary alkylphenylamine, primary halophenylamine, primary alkoxyphenylamine, primary phenoxyphenylamine, primary carboxyphenylamine, primary sulphophenylamine, primary sulphamylphenylamine, primary pyrazolylamine, primary thiazolylamine, primary thiadiazolylamine, primary pyridylamine, primary quinolylamine, lower alkylurea, benzylurea and phenylurea to form the corresponding carboxylic acid amide.

2. A process for the production of 3.5-diamino-pyrazine-2.6-dicarboxylic acid amides which comprises condensing one molecular proportion of 1.3-dialkyl-4-amino uracil with substanitally one molecular proportion of 1.3-dialkyl-4-amino-5-nitroso uracil in an acidic medium while splitting off water and ammonia to form 3.2;5.6-bis-[(1'.3'-dialkyl - 2'.4' - dioxo - 1'.2'.3'.4' - tetrahydro) - 1'.4' - pyrimidino]-pyrazine and saponifying this compound with an alkali metal hydroxide to form the 3.5-diamino-pyrazine-2-carboxylic acid amide-6-carboxylic acid while splitting off two molecular proportions of carbonic acid and transforming the carboxylic acid group formed during said alkaline treatment into a carboxylic acid amide group by treating said saponification product in a tertiary nitrogenous base in the presence of a member selected from the group consisting of ammonia, primary alkyl amine, lower primary alkenylamine, lower primary hydroxyalkylamine, primary phenyl-lower alkylamine, primary cyclohexylamine, primary phenylamine, primary alkylphenylamine, primary halophenylamine, primary alkoxyphenylamine, primary phenoxyphenylamine, primary carboxyphenylamine, primary sulphophenylamine, primary sulphamylphenylamine, primary pyrazolylamine, primary thiazolylamine, primary thiadiazolylamine, primary pyridylamine, primary quinoylamine, lower alkylurea, benzylurea and phenylurea consisting of thionyl chloride, phosphorus trichloride and phosphorus tribromide.

3. A process for the production of 3.5-diamino-pyrazine-2.6-dicarboxylic acid amides which comprises condensing one molecular proportion of 1.3-dialkyl-4-amino uracil with substantially one molecular proportion of 1.3-dialkyl-4-amino-5-nitroso uracil in an acidic medium while splitting off water and ammonia to form 3.2;5.6 - bis - [(1'.3' - dialkyl - 2'.4' - dioxo - 1'.2'.3'.4' - tetrahydro)-1'.4'-pyrimidino]-pyrazine and saponifying this compound with an alcoholic solution of at least 4 molecular proportions of an alkali metal hydroxide to form the 3.5-diamino-pyrazine-2-carboxylic acid amide-6-carboxylic acid while splitting off two molecular proportions of alkali carbonate and treating said carboxylic acid with a member selected from the group consisting of thionyl chloride, phosphorus trichloride and phosphorus tribromide to form the corresponding carboxylic acid halide and treating said carboxylic acid halide with a member selected from the group consisting of ammonia, primary alkyl amine, lower primary alkylamine, lower primary hydroxyalkylamine, primary phenyl-lower alkylamine, primary cyclohexylamine, primary phenylamine, primary alkylphenylamine, primary halophenylamine, primary alkoxyphenylamine, primary phenoxyphenylamine, primary carboxylphenylamine, primary sulphophenylamine, primary sulphamylphenylamine, primary pyrazolylamine, primary thiazolylamine, primary thiadiazolylamine, primary pyridylamine, primary quinolylamine, lower alkylurea, benzylurea and phenylurea.

4. A process for the production of 2.5-bis-methyl-amino-pyrazine - 2 - carboxylic acid methylamide-6-carboxylic acid phenylamide which comprises condensing one molecular proportion of 1.3-dimethyl-4-amino uracil with substantially one molecular proportion of 1.3-dimethyl-4-amino-5-nitroso uracil in an acidic medium at 95–118°, while splitting off water and ammonia to form 3.2;5.6 - bis-[(1'.3'-dimethyl-2'.4'-dioxo-1'.2'.3'.4'-tetrahydro)-1'.4'-pyrimidino]-pyrazine and saponifying this compound with an alcoholic solution of at least 4 molecular proportions of potassium hydroxide to form 3.5-bis-methylamino-pyrazine-2-carboxylic acid methylamide-6-carboxylic acid while splitting off two molecular proportions of potassium carbonate and treating said carboxylic acid with thionyl chloride to form the corresponding carboxylic acid halide and treating said carboxylic acid halide with aniline.

5. A process for the production of 3.5-bis-methyl-amino - pyrazine - 2 - carboxylic acid methylamide-6-carboxylic acid pyridylamide which comprises condensing one molecular proportion of 1.3-dimethyl-4-amino uracil with substantially one molecular proportion of 1.3-dimethyl-4-amino-5-nitroso uracil in an acidic medium at 90–115° while splitting off water and ammonia to form 3.2;5.6 - bis-[(1'.3'-dimethyl-2'.4'-dioxo-1'.2'.3'.4'-tetrahydro)-1'.4'-pyrimidino]-pyrazine and saponifying this compound with an alcoholic solution of at least 4 molecular proportions of potassium hydroxide to form 3.5-bis-methylamino-pyrazine-2-carboxylic acid methylamide-6-carboxylic acid while splitting off two molecular proportions of potassium carbonate and treating said carboxylic acid with thionyl chloride to form the corresponding acid halide and treating said carboxylic acid halide with 2-amino-pyridine.

6. A process for the production of 3.5-bis-methyl-amino-pyrazine - 2 - carboxylic acid methylamide-6-carboxylic acid benzene-3'-sulphonamide which comprises condensing one molecular proportion of 1.3-dimethyl-4-amino uracil with substantially one molecular proportion of 1.3-dimethyl-4-amino-5-nitroso uracil in an acidic medium at 90–115° while splitting off water and ammonia to form 3.2;5.6-bis-[(1'.3'-dimethyl-2'.4'-dioxo-1'.2'.3'.4'- tetrahydro)-1'.4'-pyrimidino]pyrazine and saponifying this compound with an alcoholic solution of at least 4 molecular proportions of potassium hydroxide to form 3.5-bis-methylamino-pyrazine-2-carboxylic acid methylamide-6-carboxylic acid while splitting off two molecular proportions of potassium carbonate and treating said carboxylic acid with thionyl chloride to form the corresponding carboxylic acid halide and treating said carboxylic acid halide with 1-amino-benzene-3-sulphonamide.

7. A process for the production of 3.5-bis-methylamino-pyrazine-2-carboxylic acid methylamide-6-carboxylic acid benzylamide which comprises condensing one molecular proportion of 1.3-dimethyl-4-amino uracil with substantially one molecular proportion of 1.3-dimethyl-4-amino-5-nitroso uracil in an acidic medium at 90–115° while splitting off water and ammonia to form 3.2;5.6 - bis - [(1'.3' - dimethyl - 2'.4' - dioxo - 1'.2'.3'.4'-tetrahydro)-1'.4'-pyrimidino]-pyrazine and saponifying this compound with an alcoholic solution of at least 4 molecular proportions of potassium hydroxide to form 3.5-bis-methylamino-pyrazine-2-carboxylic acid methylamide-6-carboxylic acid while splitting off two molecular proportions of potassium carbonate and treating said carboxylic acid with thionyl chloride to form the corresponding carboxylic acid halide and treating said carboxylic acid halide with benzylamine.

8. A process for the production of 3.5-bis-methylamino-pyrazine-2-carboxylic acid methylamide-6-carboxylic acid-2'-hydroxyethylamide which comprises condensing one molecular proportion of 1.3-dimethyl-4-amino uracil with substantially one molecular proportion of 1.3-dimethyl-4-amino-5-nitroso uracil in an acidic medium at 90–115° while splitting off water and ammonia to form 3.2;5.6-bis-[(1'.3'-dimethyl-2'.4'-dioxo-1'.2'.3'.4'-tetrahydro)-1'.4'-pyrimidino]-pyrazine and saponifying this compound with an alcoholic solution of at least 4 molecular proportions of potassium hydroxide to form 3.5-bis-methylamino-pyrazine-2-carboxylic acid methylamide-6-carboxylic acid while splitting off two molecular proportions of potassium carbonate and treating said carboxylic acid with thionyl chloride to form the corresponding carboxylic acid halide and treating said carboxylic acid halide with 2-hydroxyethylamine.

9. A process for the production of 3.5-bis-methylamino-pyrazine-2-carboxylic acid methylamide-6-carboxylic acid cyclohexylamide which comprises condensing one molecular proportion of 1.3-dimethyl-4-amino uracil with substantially one molecular proportion of 1.3-dimethyl-4-amino-5-nitroso uracil in an acidic medium at 90–115° while splitting off water and ammonia to form 3.2;5.6 - bis - [(1'.3' - dimethyl - 2'.4' - dioxo - 1'.2'.3'.4'-tetrahydro)-1'.4'-pyrimidino]-pyrazine and saponifying this compound with an alcoholic solution of at least 4 molecular proportions of potassium hydroxide to form 3.5-bis-methylamino-pyrazine-2-carboxylic acid methylamide-6-carboxylic acid while splitting off two molecular proportions of potassium carbonate and treating said carboxylic acid with thionyl chloride to form the corresponding carboxylic acid halide and treating said carboxylic acid halide with cyclohexylamine.

References Cited in the file of this patent

UNITED STATES PATENTS 2,581,889 Timmis _____ Jan. 8, 1952

OTHER REFERENCES

Timmis: Nature, vol. 164 (July-December 1949), page 139.

Brederick et al.: Chem. Ber., vol. 86 (1953), pages 845–50.

Brederick et al.: Chem. Ber., vol. 87 (1954), pages 268–73.

Taylor et al.: J. Amer. Chem. Soc., vol. 76 (1954), pages 1874–6.

Albert et al.: J. Chem. Soc. (London) (1956), pages 2066–8.

Pfleiderer et al.: Ann., vol. 612 (1957), pages 158–63.